United States Patent
Suomi

[19]

[11] Patent Number: 6,031,971
[45] Date of Patent: Feb. 29, 2000

[54] ARRANGEMENT IN AN APPARATUS FOR FORMING A WINDSCREEN INTERLAYER

[75] Inventor: Pirkko Suomi, Bryssel, Belgium

[73] Assignee: Tampereen Softeco Oy, Helsinki, Finland

[21] Appl. No.: 08/997,561

[22] Filed: Dec. 23, 1997

[30]     Foreign Application Priority Data

Feb. 6, 1997  [FI]  Finland ..................................... 970507

[51] Int. Cl.⁷ ....................................................... D02J 13/00
[52] U.S. Cl. ........................... 392/417; 392/416; 392/418
[58] Field of Search ..................... 392/417, 416, 392/418; 219/388; 34/273, 274, 277; 250/504 R; 101/467, 470

[56]             References Cited

U.S. PATENT DOCUMENTS

| | | | |
|---|---|---|---|
| 1,802,407 | 4/1931 | Danninger et al. | 34/273 |
| 2,474,093 | 6/1949 | Collidge et al. | 392/417 |
| 2,807,096 | 9/1957 | Kullgren et al. | 392/417 |
| 2,820,131 | 1/1958 | Kodama | 392/417 |
| 3,643,342 | 2/1972 | Tyson et al. | 34/555 |
| 3,826,014 | 7/1974 | Helding | 34/273 |
| 4,707,773 | 11/1987 | Miyamoto | 362/303 |
| 5,196,667 | 3/1993 | Gammelin | 392/408 |
| 5,345,534 | 9/1994 | Najm et al. | 392/422 |

FOREIGN PATENT DOCUMENTS

| | | | |
|---|---|---|---|
| 1185315 | 1/1965 | Germany | 392/417 |
| 61-289967 | 12/1986 | Japan . | |
| 63-227014 | 9/1988 | Japan . | |
| 2-133394 | 5/1990 | Japan . | |
| 4-288820 | 10/1992 | Japan . | |

*Primary Examiner*—Philip H. Leung
*Assistant Examiner*—Vinod D. Patel
*Attorney, Agent, or Firm*—Birch, Stewart, Kolasch & Birch, LLP

[57]              ABSTRACT

The invention relates to an arrangement in an apparatus for forming a windscreen interlayer that includes a heating unit for heat treating a moving web. The heating unit includes individually adjustable radiation units for directing radiation towards the moving web and a radiation restriction device for suppressing the radiation output in desired areas. According to the invention, the radiation restriction device includes a board which is essentially perpendicular to the plane of the web, the board being aligned essentially in the travel direction of the web and positioned at the level of the radiation sources at its upper end and at a distance from the web at its lower end such that no direct radiation output is directed towards the desired area of the web from the closest radiators in operation.

17 Claims, 3 Drawing Sheets

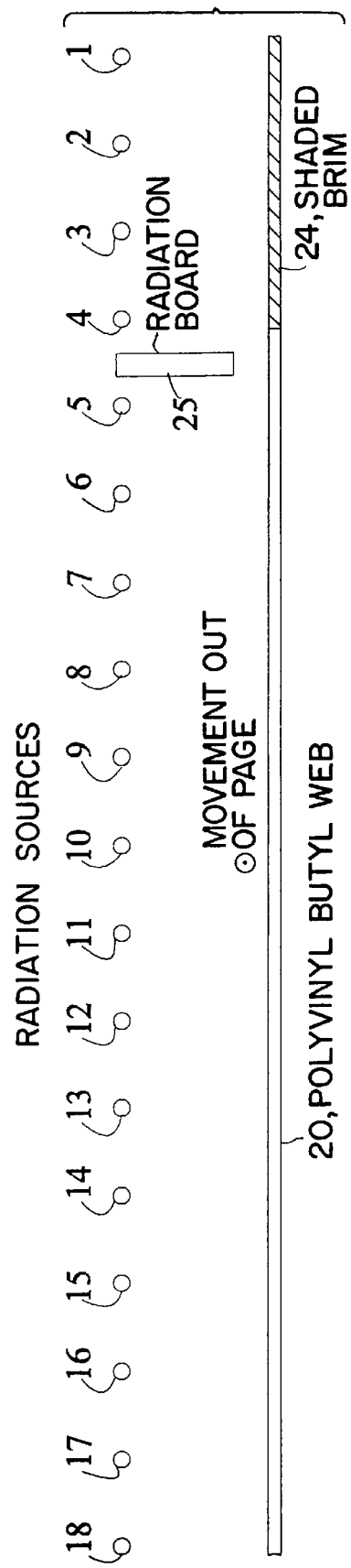

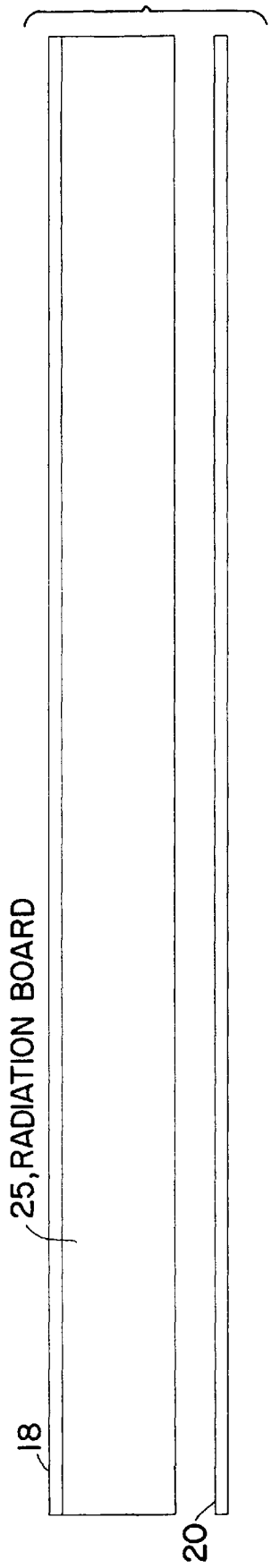

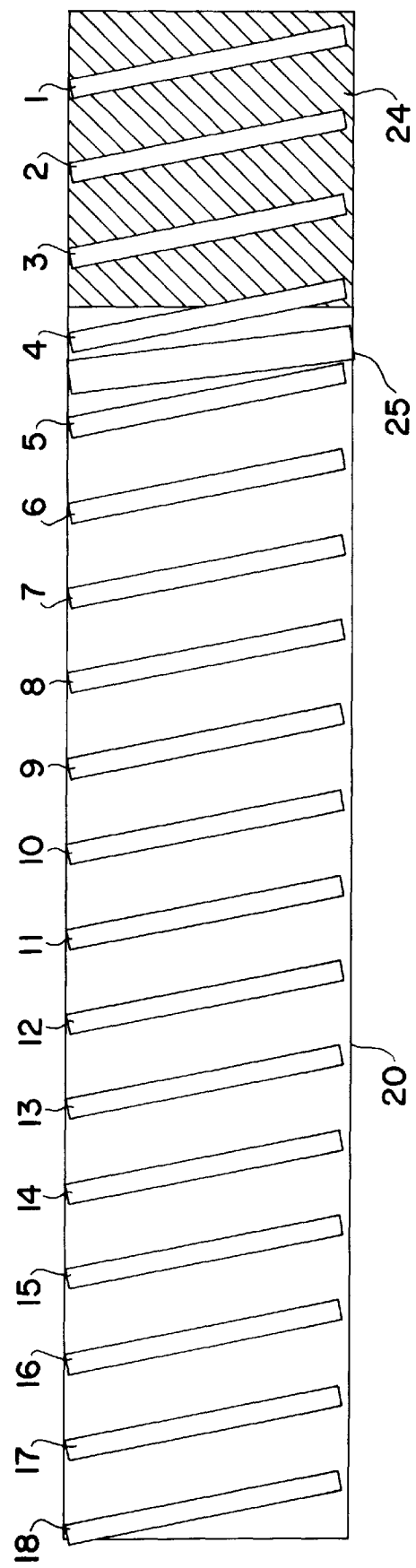

ARRANGEMENT IN AN APPARATUS FOR FORMING A WINDSCREEN INTERLAYER

BACKGROUND OF THE INVENTION

1. Field of the Invention

The invention relates to an arrangement in an apparatus for forming a windscreen interlayer.

2. Description of the Background Art

The polyvinyl butyral films used in the manufacture of screen glass are worked in a continuous process by heat treating films reeled off rolls. The heat treatment is carried out as radiation heat in a multi-lamp radiation unit. A temperature difference is created in the radiation unit between the different margin areas of the web in the cross direction of the web. The hot margin area is typically heated to a temperature of about 90° C. whereas the cold margin area is typically maintained at 30 to 50° C. By providing stretching in the heat treated material web, the curvatures needed in screen glass are obtained. The curvature is controlled by means of both the temperature and the stretching.

Today, a shaded film is increasingly often used as an anti-dazzle barrier at the brim of the film. During the heat treatment, this dark brim is the cool section of the web. As the shaded portion of the web absorbs a greater portion of the radiation than the clear section, the excess temperature rise constitutes a problem during the heating process.

The problem has been approached by putting out radiation sources at the cool brim of the web and by placing at the dark brim a radiation-barrier board which is aligned parallel with the plane of web. In the case of new shading materials, sufficiently good process control properties have not been attained by this method, and it has not been possible to form the desired temperature distribution in the web.

SUMMARY OF THE INVENTION

The present invention aims at eliminating the drawbacks of the above-described prior art and at achieving an entirely novel type of arrangement in an apparatus for forming a windscreen interlayer.

The invention is based on fitting a radiation-barrier board essentially parallel to the travel direction of the web, the board extending through the entire heating unit and at least essentially being perpendicular to the plane of the web, in the vicinity of the cool brim in the heating unit, whereby the radiation-barrier board is of a material of poor thermal conductivity, such as TEFLON (synthetic resinous fluorine-containing polymers).

The invention offers considerable benefits. For example, the heat-insulation board does not generate any harmful radiation to the cool area. By means of the vertical board, even the radiation distribution can be accurately controlled by adjusting the height of the board.

In the following, the invention is examined in closer detail in the light of the exemplifying embodiments illustrated in the annexed Figures. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a front view of the arrangement according to the invention.

FIG. 2 is a side view of the arrangement according to FIG. 1.

FIG. 3 is a top view of the arrangement according to FIG. 1.

DETAILED DESCRIPTION OF THE PREFERRED EMBODIMENTS

In accordance with FIG. 1, the heating unit of the film-forming apparatus comprises radiation sources 1 to 18, there being 18 sources in the exemplifying unit. The radiation sources 1 to 18 are arranged essentially in the travel direction of the web, the angle between the travel direction and the radiation sources being about 5 to 10°. In addition, the radiation sources are arranged with regular intervals in the transverse direction. The radiation sources 1 to 18 typically comprise halogen lamps. Other alternatives include, e.g. ceramic infrared radiators or IR gas radiators. The maximum effect of one radiation element is typically about 1 to 3 kW. The radiation output of each element is separately adjustable. A typical target for the temperature distribution of the polyvinyl butyl web 20 is 90 to 40° C. from the hot brim to the cool brim. The distance between the radiation sources 1 to 18 and the web 20 is typically 10 to 15 cm. The width of the radiation unit is typically 125 cm and its length is 100 cm. The typical total output of radiation is about 30 kW. A ventilated space is provided above the radiation sources 1 to 18, where a 1000 to 1500 m$^3$/min air circulation rate is provided from said space in order to achieve improved temperature control. The radiation sources in the figures are numbered such that the first radiation source on the right has the reference numeral 1. The initial output of the radiation sources 1 to 3 on the right is zero when a film 20 is used having a shaded brim. The shaded portion 24 coincides with these radiation elements 1 to 4. The aim is also to keep the shaded portion 24 the coolest, that is, at about 40° C. According to the invention, a radiation-barrier board 25 is placed between the radiation sources 4 and 5 at least essentially perpendicularly to the plane of the film web 20 and at least essentially in the travel direction of the web 20. As an alternative to the vertical alignment, the radiation-barrier board may be slightly tilted, e.g. 1 to 15° from the vertical position. The radiation-barrier board 25 may also be parallel with the radiation sources. The radiation-barrier board 25 is made of a heat-resistant material of poor thermal conductivity, such as TEFLON. At the top, the board 25 is placed in close proximity with the lamps 1 to 18 and extends thus far down towards the web 20 such that sufficient radiation suppression is achieved in the area 24. In this example the distance between the web 20 and the lower edge of the board 25 is 2 to 5 cm. The distance is typically the same throughout the entire radiation unit. Thus, the distance is approximately half of the mutual distance between the radiation elements which is typically 7.5 cm. As a general rule, it can be stated that the distance between the lower edge of the radiation-barrier board 25 and the web is selected such that the direct radiation output of the closest radiation elements 5 to 7 in operation does not reach the shaded zone 24.

The distance between the film web 20 and the radiation-barrier board 25 is adjustable according to the controlled output of the radiation sources 1 to 18 and/or the properties and width of the web used in each case.

Even the transverse position of the radiation-barrier board 25 can be altered because the width of the shaded area 24 varies according to the type of the web. However, the radiation-barrier board 25 is arranged in the vicinity of the border of the shaded area 24.

FIG. 2 is a side view of the structure of FIG. 1. It emerges that the radiation-barrier board 25 is rectangular in shape.

FIG. 3 is a top view of the radiation unit. In the Figure, the radiation unit is flattened in the longitudinal direction. The slightly oblique alignment of the radiation elements 1 to 18 in relation to the travel direction of the web 20 is apparent from the Figure. The radiation-barrier board 25 is also slightly inclined in relation to the travel direction of the web.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

I claim:

1. A system for heat treating a continuous web of material, the system comprising:

a continuous web of material having a first region and a second region, said web of material moving in a predefined travel direction and defining a substantially planar surface;

a plurality of substantially linear radiation elements spaced apart from each other by a first predetermined distance, said plurality of substantially linear radiation elements being divided into a first subgroup and a second subgroup, said first subgroup radiates said first region of said continuous web of material such that a temperature of said first region is within a first predetermined temperature range while said second subgroup radiates said second region of said continuous web of material such that a temperature of said second region is within a second predetermined temperature range, said first temperature range being substantially greater than said second temperature range, each linear radiation element being parallel to said substantially planar surface and oriented at an acute angle with respect to the predefined travel direction of said web of material; and a radiation restriction board having a length and a width, said length being substantially greater than said width, said length being oriented in at least one of a substantially parallel manner and at an acute angle relative to the travel direction of said web of material, said radiation restriction board including heat-resistant material having a substantially poor thermal conductivity, said radiation restriction board being spaced from said web of material by a second predetermined distance, whereby deviations from said second predetermined temperature range of said second region of said web of material are substantially reduced or eliminated.

2. The system of claim 1, wherein said heat-resistant material includes synthetic resinous fluorine-containing polymers.

3. The system of claim 1, wherein said second predetermined distance is substantially one-half of the first predetermined distance.

4. The system of claim 1, wherein said web of material includes polyvinyl butyl.

5. The system of claim 1, wherein the length of the radiation restriction board is aligned with said radiation elements in a substantially parallel manner.

6. The system of claim 1, wherein each radiation element is substantially aligned in a parallel manner with respect to a neighboring radiation element.

7. The system of claim 1, wherein said first predetermined distance is generally 7.5 cm.

8. The system of claim 1, wherein said second predetermined distance is generally between 2 to 5 cm.

9. The system of claim 1, wherein the acute angle of each radiation element is generally between 5 to 10 degrees.

10. The system of claim 1, wherein each radiation element includes a halogen lamp.

11. The system of claim 1, wherein each radiation element is spaced at a third predetermined distance from said web of material, said third predetermined distance is generally 10 to 15 cm.

12. The system of claim 1, wherein the width of the radiation restriction board is substantially perpendicular to said planar surface of said web of material.

13. The system of claim 1, wherein the width of the radiation restriction board is inclined at an angle with respect to said planar surface of said web of material, said angle is generally between 1 to 15 degrees with respect to a normal of said planar surface of said web of material.

14. The system of claim 1, wherein said first predetermined temperature range includes a temperature of 90 degrees Celsius.

15. The system of claim 1, wherein said second predetermined temperature range includes a temperature of 40 degrees Celsius.

16. The system of claim 1, wherein said first region is substantially greater than said second region.

17. The system of claim 1, wherein each radiation element has a power output generally between 1 to 3 kW, while said plurality of radiation elements has a power output of generally 30 kW.

* * * * *